(12) United States Patent
Yavor

(10) Patent No.: US 9,155,140 B2
(45) Date of Patent: Oct. 6, 2015

(54) OPTICAL WAVEFORM GENERATOR

(76) Inventor: Gabriel Yavor, Rehovot (IL)

( * ) Notice: Subject to any disclaimer, the term of this patent is extended or adjusted under 35 U.S.C. 154(b) by 729 days.

(21) Appl. No.: 13/490,478

(22) Filed: Jun. 7, 2012

(65) Prior Publication Data

US 2013/0328504 A1 Dec. 12, 2013

(51) Int. Cl.
  *H04B 10/50* (2013.01)
  *H05B 33/08* (2006.01)

(52) U.S. Cl.
  CPC ........ *H05B 33/0815* (2013.01); *H04B 10/5057* (2013.01)

(58) Field of Classification Search
  CPC ............... H04B 10/5057; H04B 10/50572; H04B 10/50575
  See application file for complete search history.

(56) References Cited

U.S. PATENT DOCUMENTS

| | | | |
|---|---|---|---|
| 4,818,896 A | 4/1989 | Cavanna | |
| 5,115,147 A | 5/1992 | Kusano et al. | |
| 5,343,323 A | 8/1994 | Lynn et al. | |
| 5,469,479 A * | 11/1995 | Chang et al. | 375/377 |
| 6,049,175 A | 4/2000 | Forsberg | |
| 6,281,471 B1 | 8/2001 | Smart | |
| 6,724,376 B2 | 4/2004 | Sakura et al. | |
| 7,348,516 B2 | 3/2008 | Sun et al. | |
| 7,411,662 B1 * | 8/2008 | Ruff et al. | 356/5.15 |
| 7,428,253 B2 | 9/2008 | Murison et al. | |
| 7,453,306 B2 | 11/2008 | Baumgartner et al. | |
| 7,772,550 B2 * | 8/2010 | Schaefer et al. | 250/290 |
| 7,795,967 B2 * | 9/2010 | Nakai et al. | 330/129 |
| 7,873,329 B2 * | 1/2011 | Mann et al. | 455/73 |
| 7,905,839 B2 * | 3/2011 | Misono | 600/462 |
| 7,952,516 B2 * | 5/2011 | Atherton | 342/200 |
| 8,073,027 B2 | 12/2011 | Deladurantaye et al. | |
| 8,309,926 B2 * | 11/2012 | Borosak | 250/338.1 |
| 2006/0260639 A1 * | 11/2006 | Fani et al. | 134/1 |
| 2010/0322271 A1 * | 12/2010 | Ichino et al. | 372/26 |
| 2011/0043328 A1 * | 2/2011 | Bassali | 340/5.71 |
| 2011/0280265 A1 * | 11/2011 | Desbiens et al. | 372/38.02 |
| 2014/0080225 A1 * | 3/2014 | Chodavarapu et al. | 436/172 |

* cited by examiner

Primary Examiner — Thomas J Hiltunen

(57) ABSTRACT

An optical high speed Arbitrary Waveform Generator (AWG) comprising a trigger module configured to receive binary signals and generate a trigger output in response, a digital waveform shaper (DWS) module configured to be programmed by a digital waveform and convert it to analog waveform, an amplifier module configured to amplify the analog waveform, a load adapter module configured to match the electrical impedance of the amplifier module to the electrical impedance of a light source, a TEC controller and a voltage supply module adapted to supply voltage to the trigger module, the digital waveform shaper module, the amplifier module, and the load adapter and the TEC controller.

35 Claims, 10 Drawing Sheets

OPTICAL WAVEFORM GENERATOR

FIELD OF THE INVENTION

The present invention relates to the field of laser and light-emitting diodes (LED) devices, and more particularly concerns with a waveform generation and current driving platform for high speed and high power applications.

BACKGROUND OF THE INVENTION

High speed and high power light sources, particularly lasers and light-emitting diodes (LEDs) are used in numerous industrial, biomedical and defense applications. Many laser-based material processing e.g., laser drilling, cutting, engraving welding etc., require pulses of high speed and power. Likewise, LEDs become ever more popular as light source for microscopy and machine vision systems, requiring bright and often strobed (pulsed) illumination. Other applications, particularly those involving diode lasers, or fiber lasers require arbitrary waveform shape, where the waveform is specified point-by-point by the user. The shape of the waveform namely, the amplitude, pulse duration, the rise time and fall, and other are essential part of the application. And while the shape of the waveform can be digitally defined with high precision, the actual optical output may differ from the specified waveform shape if the driver is not designed to match the specific characteristics of the light source.

U.S. Pat. No. 7,348,516 to Sun et al. describes three different laser architectures providing a certain control over the laser pulse shapes. U.S. Pat. No. 6,281,471 to Smart, entitled "Energy-efficient, laser-based method and system for processing target material" describes many requirements and specifications concerning the temporal generation of square laser pulse shapes in material processing. The system presented therein includes, among its main components, a controller for generating a processing control signal, and a signal generator for generating a modulated drive waveform based on the processing control signal. A common pulse shaping technique such as for example disclosed in U.S. Pat. No. 7,428,253 issued to Murison et al. uses digital electronic means where sequence of digital points stored in a memory is passed to a digital-to-analog converter (DAC). The shaped analog signal output by the DAC is then fed to a an amplifier having enough bandwidth and drive capability for directly modulating a light source such as a laser diode U.S. Pat. No. 8,073,027 to Deladurantaye et al describes a practical architecture for implanting digital pulse shaping module for controlling a pulsed laser oscillator.

Although the aforementioned inventions provide solutions for shaping an optical waveform, they do not address directly the difficulties associated with certain physical characteristics of light sources and matching the current waveform to the light output thereof.

One such difficulty associated with driving a light source such as a laser diode (LD) and LED is a time delay between an on-off transition in the drive current and the on-off transition in the light output. This time delay results from a relatively large capacitance and inductivity of a typical LD or LED. A common approach in the art to address the issue is by pre-shaping the electrical pulses that drive the light source. For example, U.S. Pat. No. 4,818,896, issued to Cavanna, discloses a driver which pre-shapes current pulses by adding current "spikes" during the rise and the fall of the light source in order to quickly charge and discharge the associated capacitances of the LED. Different architectures for realizing "peaking of leading and trailing edges of current pulses are disclosed in U.S. Pat. No. 5,343,323 (Lynn, et al) U.S. Pat. No. 5,115,147 (Kusano, et al), and U.S. Pat. No. 6,724,376 (Sakura, et al), U.S. Pat. No. 6,049,175 (Forsberg). U.S. Pat. No. 7,453,306 issued to Baumgartner discloses a driver for controlling both the height and the width of peaking current to account for variations in capacitance and inductance of LD and LED.

Another difficulty is to overdrive LDs and LEDs for having increased optical peak power but without scarifying their reliability.

While the above-mentioned generators provide solution for pulsed light sources, they do not address the situations where the laser or LED is required to operate at arbitrary waveform. Therefore, there is a need for an optical waveform generator that will provide the means for pre-shaping the driving waveform to comply with different lasers and LED providing various pre-programmed optical waveforms, and providing a multiple feedback options to adjust the pre-shaped waveform to the optical output thereof.

SUMMARY OF THE INVENTION

The present invention provides an optical high speed Arbitrary Waveform Generator (AWG) comprising: a trigger module configured to receive binary signals and generate a trigger output in response; a digital waveform shaper (DWS) module configured to receive a digital waveform and convert it to analog waveform; an amplifier module configured to amplify the analog waveform; a load adapter module configured to match the electrical impedance of the amplifier module to the electrical impedance of a light source; a voltage supply module adapted to supply voltages to the trigger module, the digital waveform shaper module, the amplifier module and the load adapter and an optional TEC controller.

The trigger module may comprise an internal source of binary signals.

The DWS module may comprises: a logic unit; a waveform memory unit connected with the logic unit; a clock and timing system connected with the logic unit; and at least one Digital to Analog Converter (DAC) connected with the logic unit, the logic unit configured, when triggered by the trigger module, to access the waveform memory and replay a digital waveform therefrom in a sequential order; the clock configured to control the time interval between consecutive points in the waveform, the timing system configured to adjusts the time delays between the trigger, the logic and the DAC, the DAC configured to convert the digital flow of points to analog signal.

The at least one DAC may comprise two DACs.

The at least one DAC may comprise differential output stage for producing two output analog voltages out of phase.

The DWS may be configured to communicate with a user's electronic device.

The AWG may additionally comprise a switch configured to disconnect the flow of data to the DAC.

According to another third embodiment the DWS module may comprise a Field Programmable Gate Array (FPGA) comprising a memory unit configured to store at least one digital waveform; a flash memory configured to store initializing parameters of the FPGA; a clock and timing system connected with the FPGA; and at least one Digital to Analog Converter (DAC) connected with the FPGA, the FPGA configured, when triggered by the trigger module, to replay the sequence of points in the digital waveform; the clock configured to control the time interval between consecutive points in the waveform, the timing system configured to adjusts the time delays between the trigger, the logic and the DAC, the DAC configured to convert the digital flow of points to analog signal.

The at least one DAC may comprise two DACs.

The at least one DAC may comprise differential output stage for producing two output analog voltages out of phase.

The AWG may additionally comprise a switch configured to disconnect the flow of data to the DAC.

The DWS may be configured to communicate with a user's electronic device.

The communicating may comprise receiving a digital waveform from the electronic user device.

The amplifier module may comprises: a first amplifier configured to convert a low-level voltage produced by the DAC into a larger voltage signal; a second amplifier configured to receive the amplified signal, the second amplifier connected with the first amplifier through three port network bias-T connector arrangement that is also connected to a DC voltage source; and a feedback mechanism configured to provide the second amplifier a feedback signal for the final amplification.

The first amplifier may be selected from the group consisting of: a RF amplifier, a high speed operational amplifier and a video amplifier.

The second amplifier may be a fast operational amplifier or a differential amplifier circuit.

The bias-T connector may comprise a switch configured to disconnect the voltage supply to the bias-T connector.

The feedback mechanism may comprise an optical tap configured to receive a fraction of the light output from the light source and convert it to an electrical signal.

The feedback may comprise one of an average and a peak on the electrical signal.

The feedback mechanism may comprise the output current that drives the light source.

The feedback may comprise one of an average and a peak on the output current.

The second amplifier may be connected with a variable voltage supply and with one of a mid or high power field-effect transistor (FET) and bipolar junction transistors (BJT).

The variable voltage supply may be provided with a shutdown feature configured to deactivate the voltage and disable the light source.

The light source may be selected from the group consisting of: Laser Diode (LD), array of diode lasers, diode laser bars, light emitting diode (LED) and LED array.

The light source comprises part of a larger system including an amplifying stage.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

Figure 1:
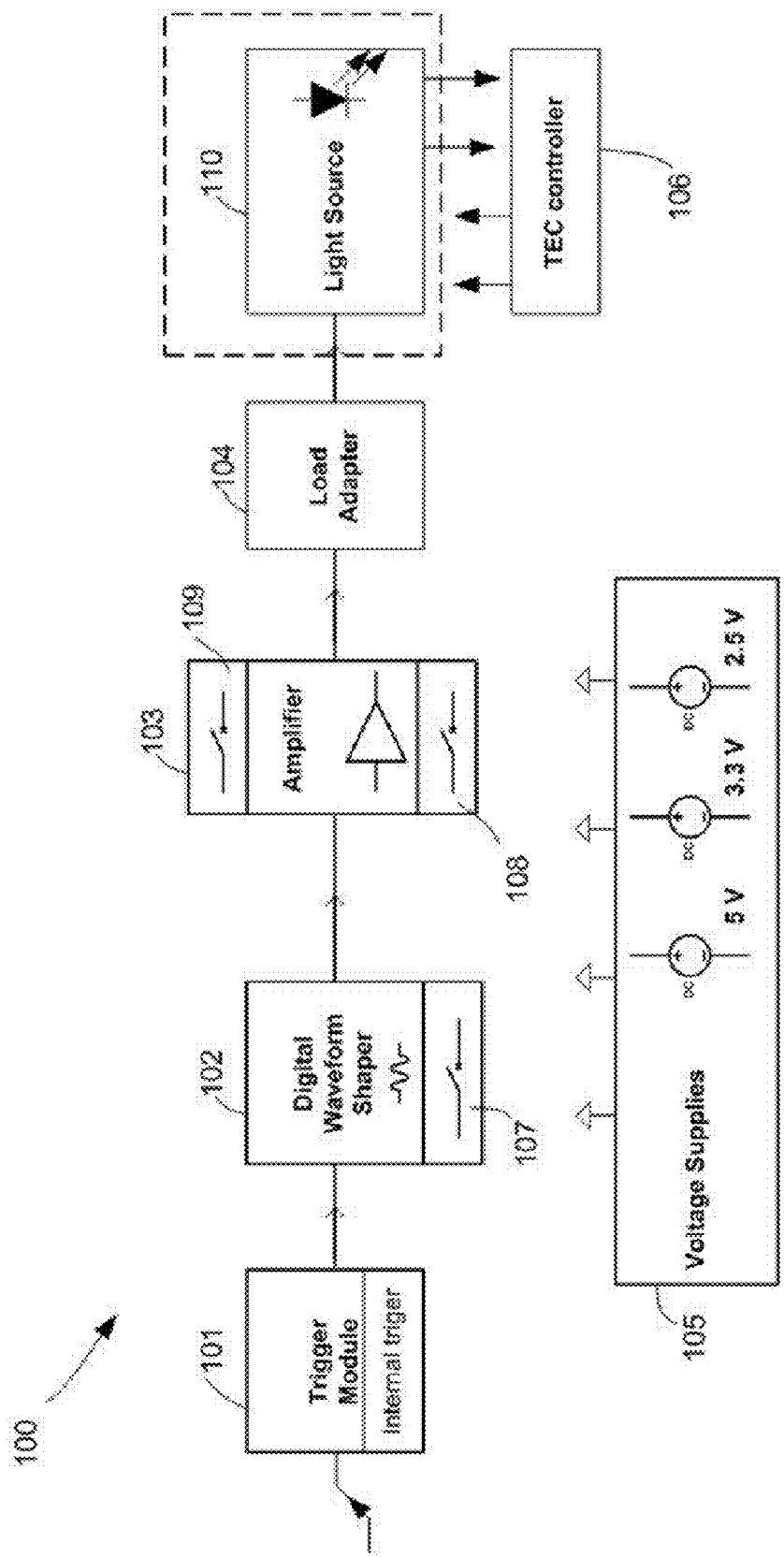
FIG. 1 is a schematic layout of an optical waveform generator.

Referring to FIG. 1, there is shown a schematic representation of an optical waveform generator controlling the light source. Light source is understood to refer to any of the laser sources e.g., a Laser Diode (LD), array of diode lasers, or diode laser bars. Alternatively, a light source can refer to a light emitting diode (LED) or LED array. The light source may be part of a larger system including amplifying stage, such as, for example, seed laser in fiber laser amplifiers, or in any master oscillator power amplifier (MOPA) configuration. A light source may also refer to the pump sources of the optical amplifying stage. It is to be understood that other types of light sources can be used in specific embodiments of the present invention.

In general, the optical waveform generator has a cascaded architecture that contains three stages: a trigger stage that initiates the signal, a waveform shaping stage where a particular shape of waveform is constructed, and an amplification stage where the waveform is amplified to the electric current and voltage levels required to drive the light source.

FIG. 1 is a schematic simplified arrangement of the optical waveform generator 100 comprising a number of sub systems, namely, a trigger module 101, a digital waveform shaper module 102, an amplifier stage 103, and a load adapter 104 that connects to the light source 110. The optical waveform generator may include other sub systems such as a selection of DC voltage supplies 105 adapted for powering the different electronic components which may require different driving voltages. For selected optical sources the optical waveform generator 100 may also include a thermal controller 106 that typically consists of a temperature sensor (not shown), a Thermo Electric Cooler (TEC) and TEC current driver and feedback circuit for controlling the temperature of the optical light source.

An essential advantage of the cascaded architecture is the enhanced level of safety features imperative to any application requiring laser or high power light source operation. The optical waveform generator contains three controls for deactivating the light output. First safety control 107 sets a zero voltage signal out of the digital waveform shaper. This effectively produces a zero signal in the subsequent output stage. Second safety control 108 located in the amplifier module is a switch that shuts down the voltage source to the light source. Yet another safety control 109 located in the amplifier module prevents the current from flowing into the light source and thus deactivating the emission of light.

Trigger Module

The trigger module 101 is a threshold circuit capable of receiving any binary signals, typically higher than 1 V, and generating a trigger output in response to the binary signals. A typical trigger module known in the art is a Schmitt circuit buffer generating a trigger in a form of Transistor—Transistor Logic (TTL) signal, or Low Voltage Transistor—Transistor Logic (LVTTL) signal. The output trigger signal of the trigger module 101 is fed to the Digital Waveform Shaper block 102.

In certain applications it may be desirable to repeat a waveform a large number of times without using an external binary signal. The trigger module may contain an internal source of binary signals as the source of internal trigger for Schmitt circuit buffer.

Digital Waveform Shaper (DWS)

Figure 2:
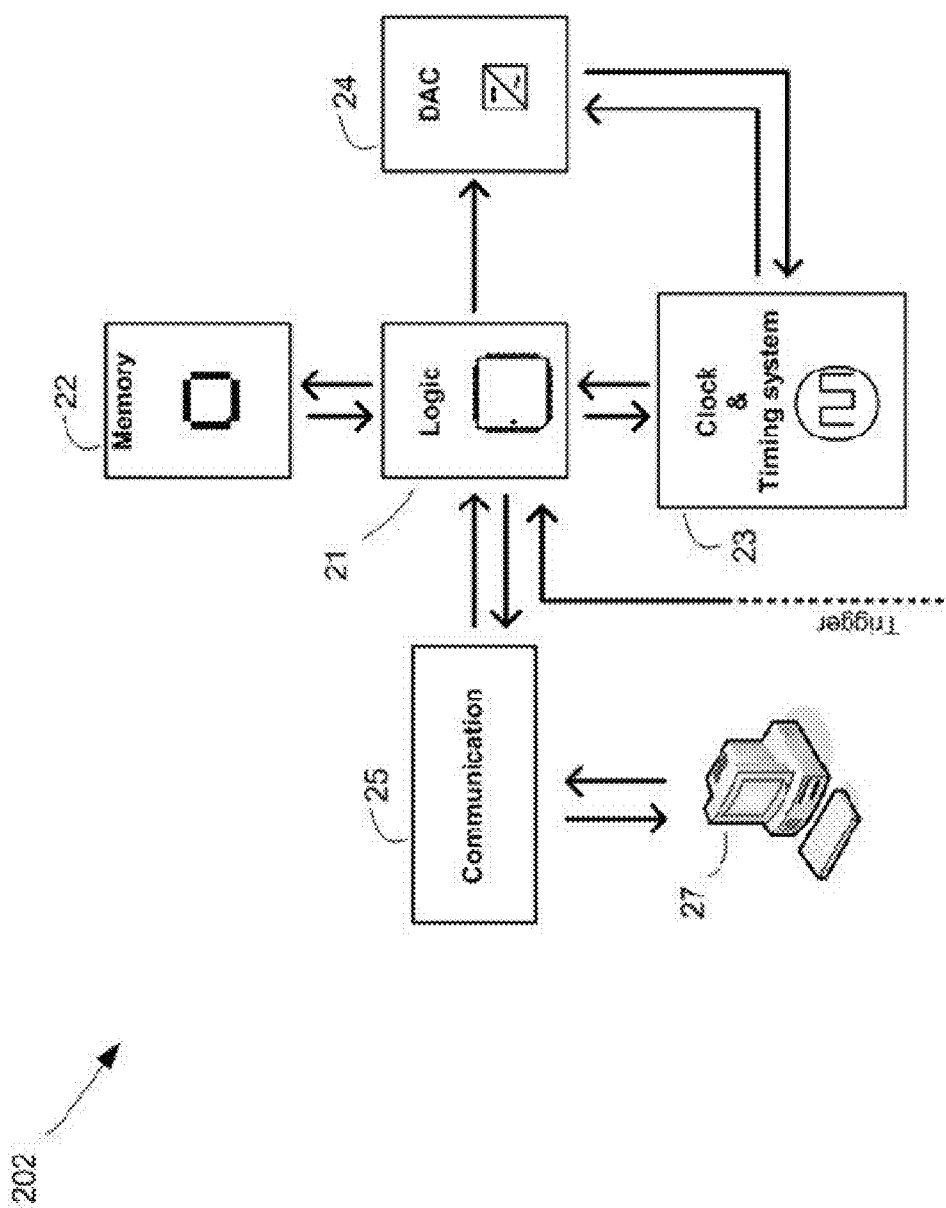
FIG. 2 schematically illustrates the digital waveform shaping unit.

FIG. 2 is a schematic block diagram of an exemplary DWS 202 according to an embodiment of the present invention, comprising a logic unit 21, a waveform memory unit 22, a clock and timing system 23 and a Digital to Analog Converter (DAC) 24. A programmed waveform is stored as a sequence of points in the waveform memory 22. The waveform memory may also be physically integrated in the logic unit. When triggered, the logic unit 21 accesses the waveform memory unit 22 and a digital waveform is replayed from the memory in a sequential order. Alternatively a "soft trigger" may initiate the process, where the soft trigger is a command carried through the communication unit (25). The time interval between consecutive points in the waveform is controlled by the clock 23. A timing system based on the clock adjusts the time delays between the trigger, the logic and the DAC. The digital flow of points is then converted to analog signal by the DAC 24. The data flow is shown schematically in FIG. 2 by a single connection line 26, but it is understood that digital data can be conveyed to DAC by several bus lines. The timing system derived from the clock also serves to adjust the phase of the DAC to the logic.

In certain embodiments the DWS can contain two DAC units or a DAC unit with differential output stage for producing two output analog voltages out of phase (typically 180° out of phase).

Preferably the DWS is adapted to interact with a user via communication interface 25 to a PC 27, or other user electronic equipment within a larger system containing the generator of the present invention.

A particular feature of the DWS is a control 107 that disables the input to the DAC and hence acts as a safety feature to disable generator output since disabling the input to the DAC results in zero analog output voltage.

Figure 3:
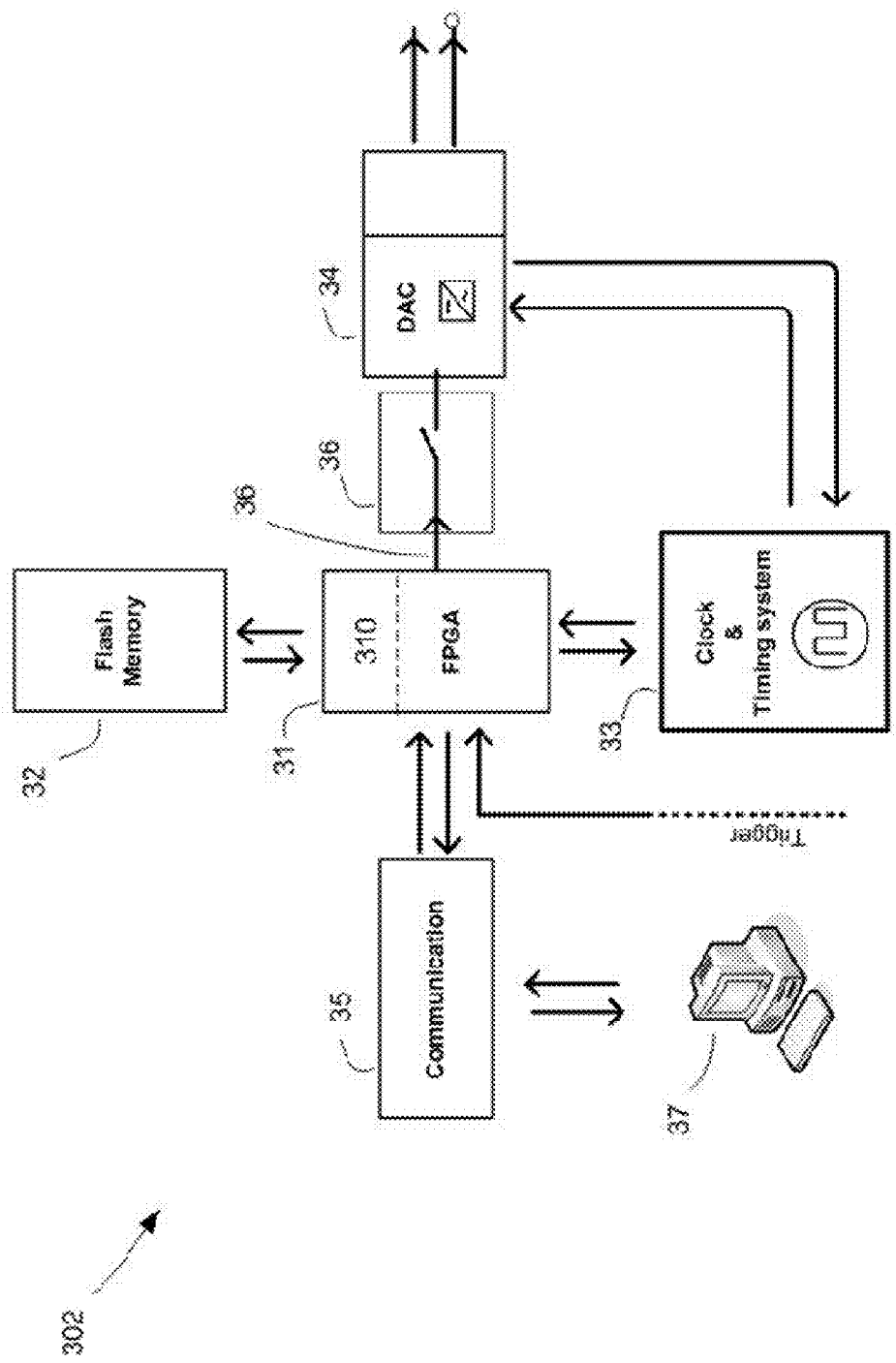
FIG. 3 is an exemplary arrangement of a digital waveform shaper.

According to another exemplary embodiment of the present invention, the Digital Waveform shaper 302 in FIG. 3 comprises a Field Programmable Gate Array (FPGA) 31, and a flash memory unit 32 for storage of initializing parameters of the FPGA. Typically the user defines a digital waveform by editing an array of points on a PC 37. The index of a point in an array determines its position within the sequence of points, while the value is a digital value of the intensity. The array of points is passed via the communication interface unit 35, and is stored into a memory unit 310 which is a part of the FPGA 31. When triggered the FPGA replays the sequence of points where the time interval between successive points is set by given multiplies and fraction of the clock 33. Alternatively instead of a trigger signal a "soft trigger" command carried through the communication unit (35) may initiate the process. The digital data is then flowed to the DAC 34 through a switch 36 that can disconnect the flow of data to the DAC and serves as a safety feature to disable voltage output from the generator as explained above.

In the embodiment shown in FIG. 3 a single DAC is shown and digital data from the FPGA is shown to flow over a single line 38, however it will be obvious to any person skilled in the art that digital data can be conveyed over multiple lines, and two DAC units can be utilized for differential analog output from the DAC.

A timing system based on the clock system 33 adjusts the time delays between the trigger, the logic and the DAC.

Depending on the size of the available memory and the length of sequence points in a waveform a number of user defined waveforms can be stored. These waveforms are digitally labeled and can be accessed independently by the FPGA. Furthermore a specified sequence of stored waveforms can be operated thus synthesizing a complex waveform out of stored waveforms.

An advantage of this embodiment is that in general, the user can define an arbitrary waveform limited only by the size of the memory unit. In alternative embodiments, where the arbitrary shape of the waveform may not be required, the FPGA can be replaced by a simpler logic unit, such as for example a Complex Programmable Logic Device (CPLD), or a circuit comprised of Emitter-Coupled Logic (ECL) components or similar. A set of pre-programmed waveforms, such as for example a square wave, are stored within the waveform memory unit. The user can define the pulse width as well as adjust the delay between the trigger pulse and the beginning of playback of the waveform.

In alternative arrangement of the DWS the synthesis of desired waveform is realized using Emitter-Coupled Logic (ECL), Low Voltage ECL (LVECL), Positive ECL (PECL) or Low voltage ECL logic which may replay different segments of stored pre-programmed waveforms and introduce variable delay between such segments using a timed sequence set by the clock unit.

Amplifying Stage

The amplifying block stage 103 is essentially a current driver adapted to operate at voltage and current levels required by the light sources. The analog waveform emerging from the DAC (24, 34) has the desired voltage waveform, however its level is usually insufficient to drive a light source, and furthermore, the output light power might not exactly follow the electrical signal. The amplifying stage acts to amplify the waveform out of DWS 102 to the desired levels of light source, and to provide feedback such that the light source will follow a specific pattern based on the light output power or electrical current to the light source.

Figure 4:
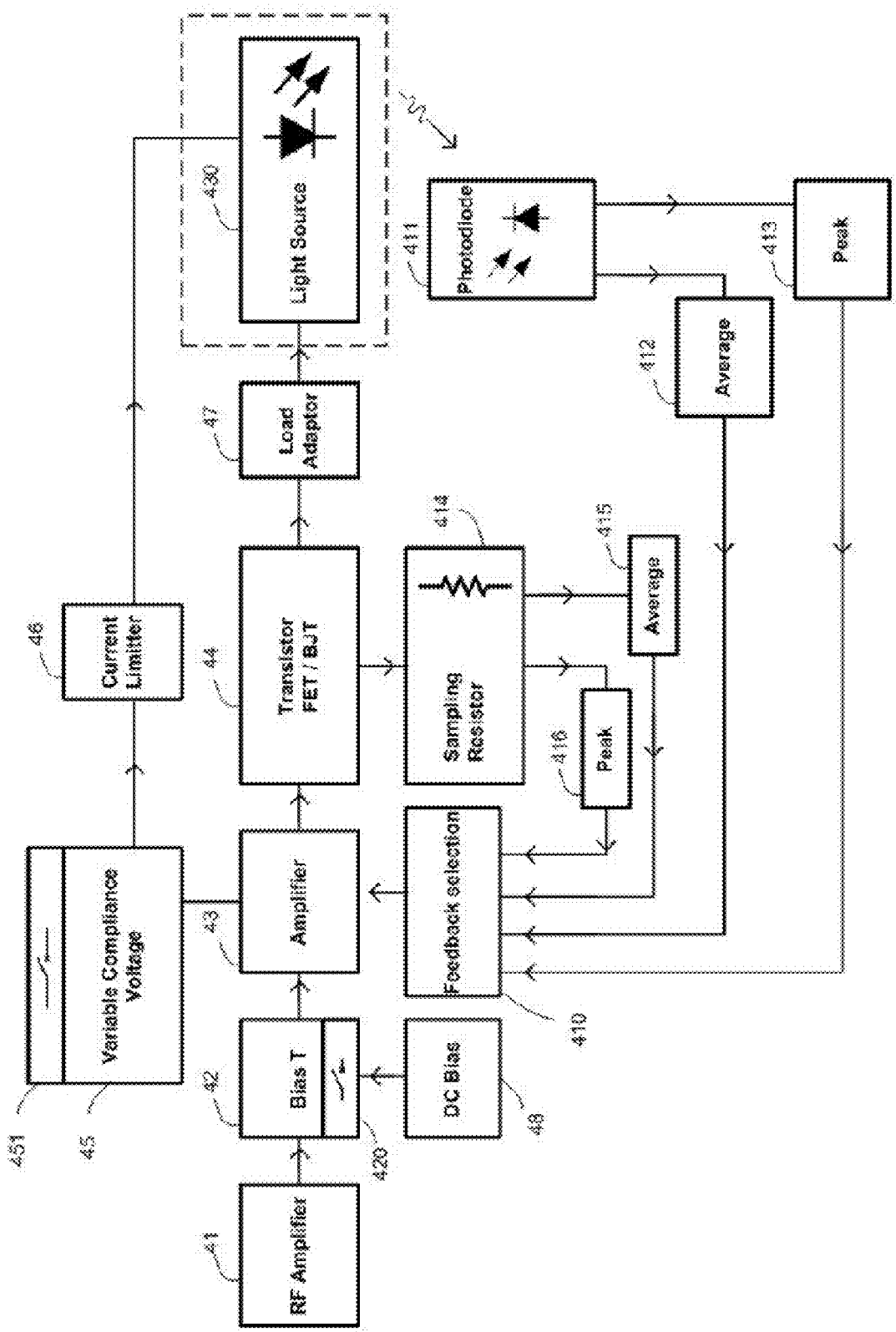
FIG. 4 is a schematic layout of the amplifying stage, including the load adaptor and the light source, according to an embodiment of the invention.

An exemplary schematic arrangement of the amplifying block stage 400 is depicted in FIG. 4. The stage comprises two amplification stages and a feedback stage. The first pre-amplification stage consists of a RF amplifier, or a high speed operational amplifier, or a video amplifier 41 that converts the low-level voltage produced by the DAC into a larger voltage signal. The output from RF-amplifier 41 is fed into a fast operational amplifier 43 preferably through three port network bias-T connector arrangement 42 that is also connected to a DC bias source 48. The bias-T circuit may also contain a 'shutdown' feature 420. By breaking the voltage supply to the bias-T the waveform is effectively 'shutdown', consequently no power reaches the light source.

Figure 5A:
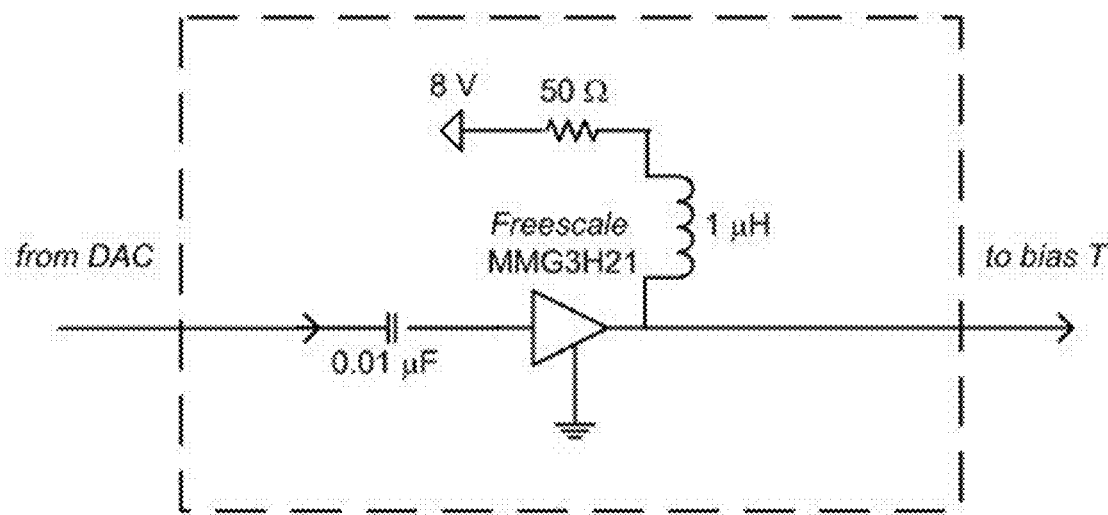
FIG. 5 is an exemplary circuit of the pre-amplifying stage with bias-T connector arrangement which is a part of embodiment of FIG. 4.
Figure 5B:
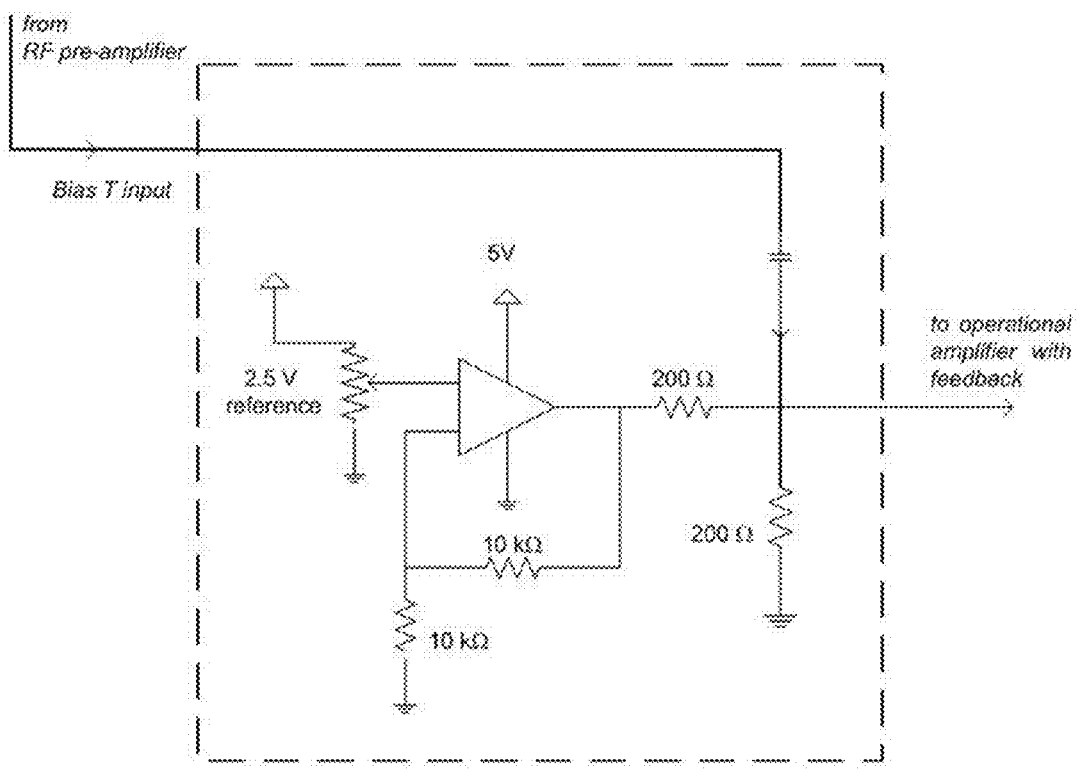

An exemplary circuit of pre-amplifying stage based on a linear amplifier by Freescale MMG3H21 is shown in FIG. 5A. Such a scheme can provide voltage gain of ×10 and up to frequencies of 2000 MHz. FIG. 5B exhibits an exemplary circuit for connecting the pre-amplifier output to a DC biased bias-T connector.

Although the bias-T connection adds flexibility to the AWG, in certain embodiments where it is not necessary to maintain close control on the DC level of the waveform the DAC can be connected directly to the amplification stage. Likewise in alternative embodiments the pre-amplifying stage can be avoided wherein the output voltage waveform can be fed directly, or through a bias-T arrangement into the operational amplifier.

Returning to FIG. 4, the output signal from the RF—amplifier that may be DC biased is fed into a fast operational amplifier 43, or a differential amplifier circuit. In addition to the incoming signal, the amplifier 43 receives a feedback signal for the final amplification according to one of the feedback schemes set by the user.

A common feedback mechanism for controlling light sources is by monitoring the output power using an optical tap which receives a minute fraction of the light output and converts it to an electrical signal. Frequently the preferred feedback is on the average optical power produced by the light source. Therefore the electrical feedback signal out of the light tap is averaged and then fed to the operational amplifier. In other circumstances it is necessary to control the peak optical power. The electric signal out of the light tap is then fed to a peak detector 413 before feedback into the amplifier.

In alternative modes of operation the user may prefer to avoid using light taps and use the output current that drives the light source as the feedback means. A small fraction of the current is then split and serves to close the feedback loop. At this point the preferred feedback may be on the average current, or a peak current as explained above.

In FIG. 4 a feedback selection box 410 is adapted to receive a feedback signal from a photodiode 411 that acts as an optical tap for monitoring the output power from the light source 430. The feedback signal may pass directly as a real-time feedback, or may be averaged in a particular circuitry 412, or a module with peak detector for a feedback on the peak power level 413.

For feedback based on the current that drives the light source, the feedback signal is generated by a sampling resistor 414. Again, the electrical signal can be passed directly or averaged in a specific circuitry 415 or through a peak detector feedback on the peak current 416.

Figure 6:
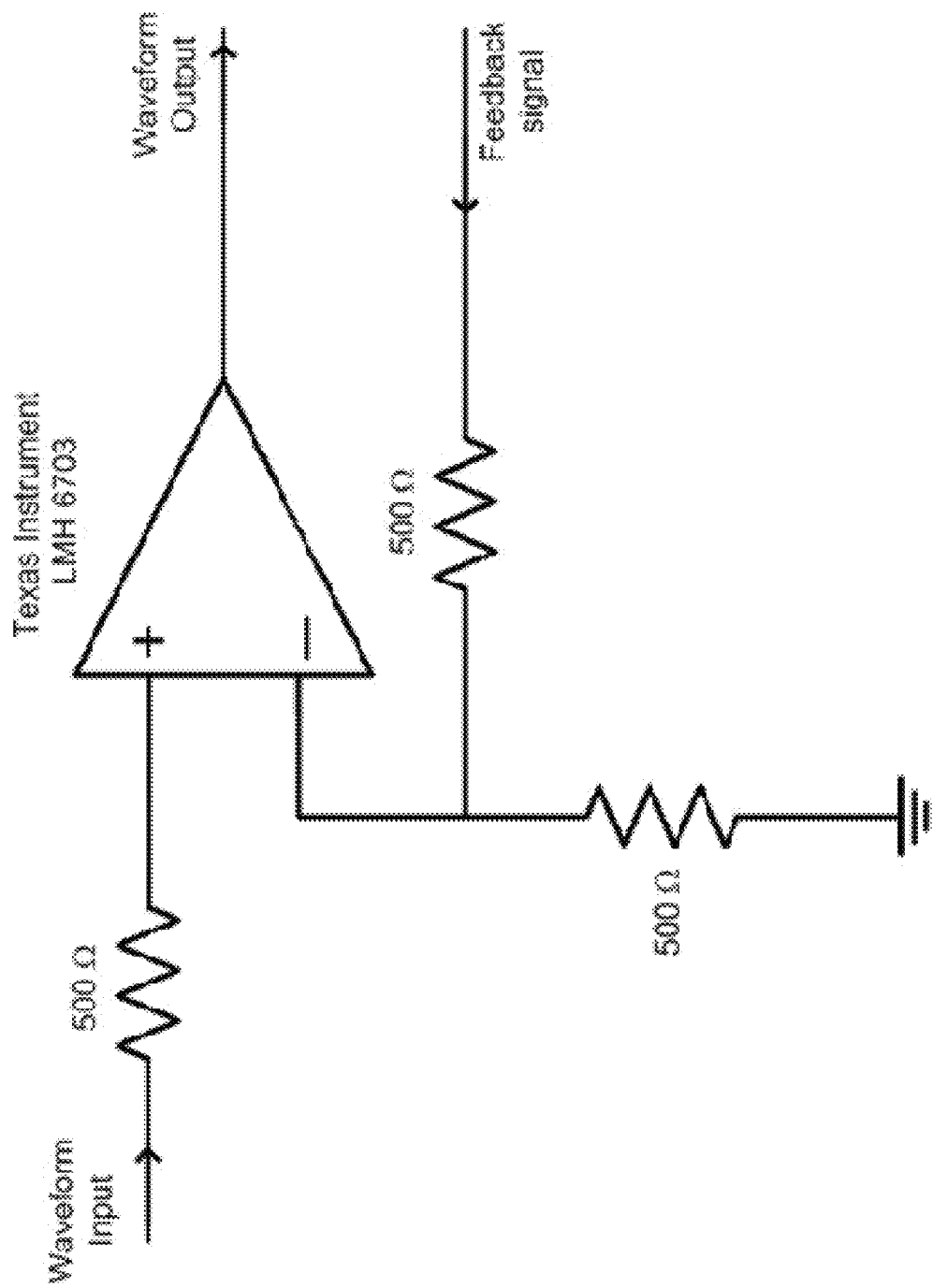
FIG. 6 is an exemplary circuit of an operational amplifier with feedback which is a part of embodiment of FIG. 4.

FIG. 6 is an example circuit of operational amplifier with a feedback arrangement shown schematically. The circuit is based on Texas Instrument LMH 6703 which offers a gain factor of 2 and bandwidth of 500 Mhz for large signal and 2000 GHz for small signals.

Returning to FIG. 4, the second amplification stage consists of a variable voltage supply 45 and a mid or high power field-effect transistor (FET), or equivalently bipolar junction transistors (BJT) 44.

The variable voltage supply is provided with a shutdown feature 451 which deactivates the voltage and hence disables the light source. Preferably, to protect the light source from damage by over current, the voltage source may contain a current limiter 46.

The current to a specific diode laser or LED vary significantly depending on the optical output power. The voltage on the other hand does not change significantly, typically logarithmically with the current. Nevertheless the voltage supply of the present invention is adapted to provide voltage levels suitable for a variety of light sources, as for example several LEDs or diode lasers connected in series. Here the required voltage is multiplied by the number of light sources in series. In general, the variable compliance voltage has the advantage that it allows the user to operate many types of light sources without modifying the hardware.

Figure 7A:
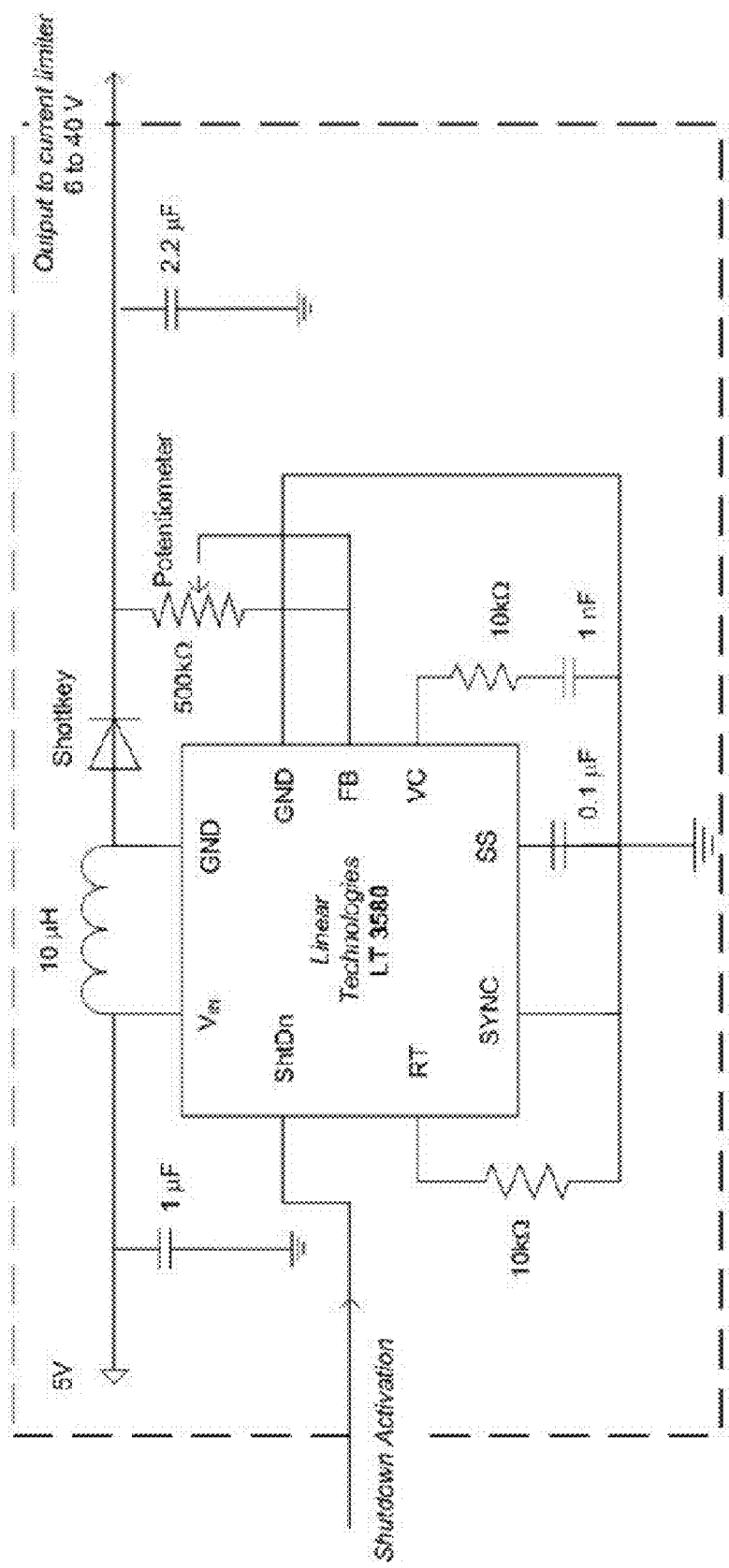
FIG. 7 is an exemplary circuit of variable compliance voltage and current limiter with feedback which is a part of embodiment of FIG. 4.

FIG. 7A shows an exemplary configuration of a voltage supply based on Pulsed Width Modulation (PWM) DC/DC converter LT3580 by Linear Technologies, capable of converting fixed 5V input to output voltage range of 6 to 40 volts. The voltage unit also provides a safety feature where 'Shutdown Activation' deactivates the voltage converter and effectively disables the light source.

A current limiter that follows the variable compliance voltage protects the light source from overcurrent. Since the voltage waveform may contain fast temporary transitions, for the current limiter to be effective it must respond sufficiently fast, as overcurrent peaks typically occur at the points of fast transitions, e.g., rising and falling edges of a pulse.

Figure 7B:
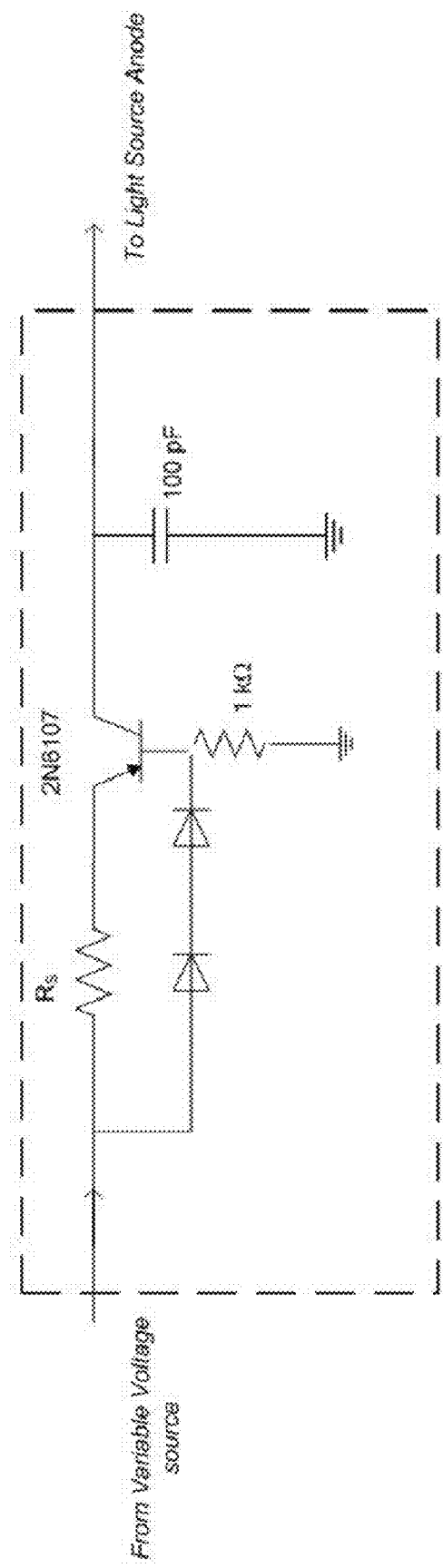

An exemplary current limiter in FIG. 7B makes use of switching transistor 2N6107 available for example from ST Microelectronics. The current limit is given approximately by $0.7 V/R_S$ where $R_S$ is given in unit of ohms. It is important to avoid large capacitance at the output to ensure fast response of the current limiter.

Figure 8:
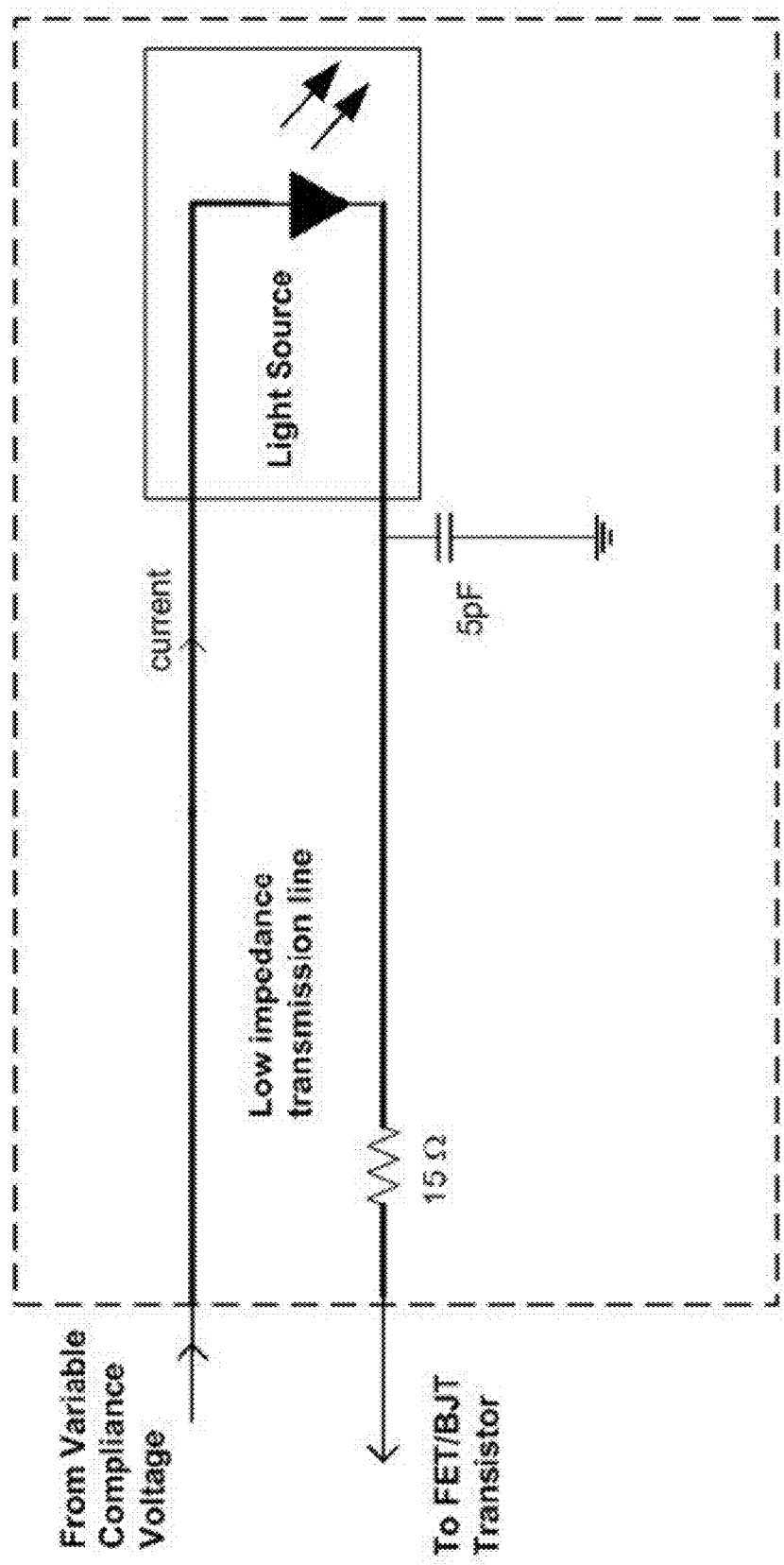
FIG. 8 is an exemplary circuit of load adapter which is a part of embodiment of FIG. 4.

Very often, light sources, particularly diode lasers or lasers where a diode laser serves as a seed, are required to operate at high frequencies of megahertz or even gigahertz. This requires careful consideration of the reactive impedance of the light source. Due to inherent variations between diode lasers of different manufacturers, or even between different species of the same manufacturer, the current driver block 400 of present invention may contain an impedance, or "load", adapter circuit. Returning again to FIG. 4, a load adapter 47 may be positioned before the light source 430. A simple load adapter shown in FIG. 8 would be placing a resistor in series with the diode laser and a small capacitor in parallel to the LD, wherein the actual values of the capacitor and resistor depend on the calculated impedance of the wires connected to the light source. The resistor should have a higher resistance than the dynamic resistance value of the laser such that any variation in the impedance of the laser would be negligible, however the resistance should not too high since this requires a high voltage to drive the laser at the operating current.

The amplifying stage of FIG. 4 may act as a standalone electrical to optical linear converter module for driving a light source according to an input analog voltage waveform. As with amplifying stage within the embodiment of the waveform generator the advantage of using the amplifying stage as a standalone electrical to optical linear converter unit is that it offers variable compliance voltage to drive a diversity of light sources, a choice of feedback schemes, and enhanced safety features for deactivating the light source.

In an alternative embodiment the pre-amplifying stage can be avoided wherein the output voltage waveform can be fed directly, or through a bias-T arrangement into the operational amplifier.

Figure 9:
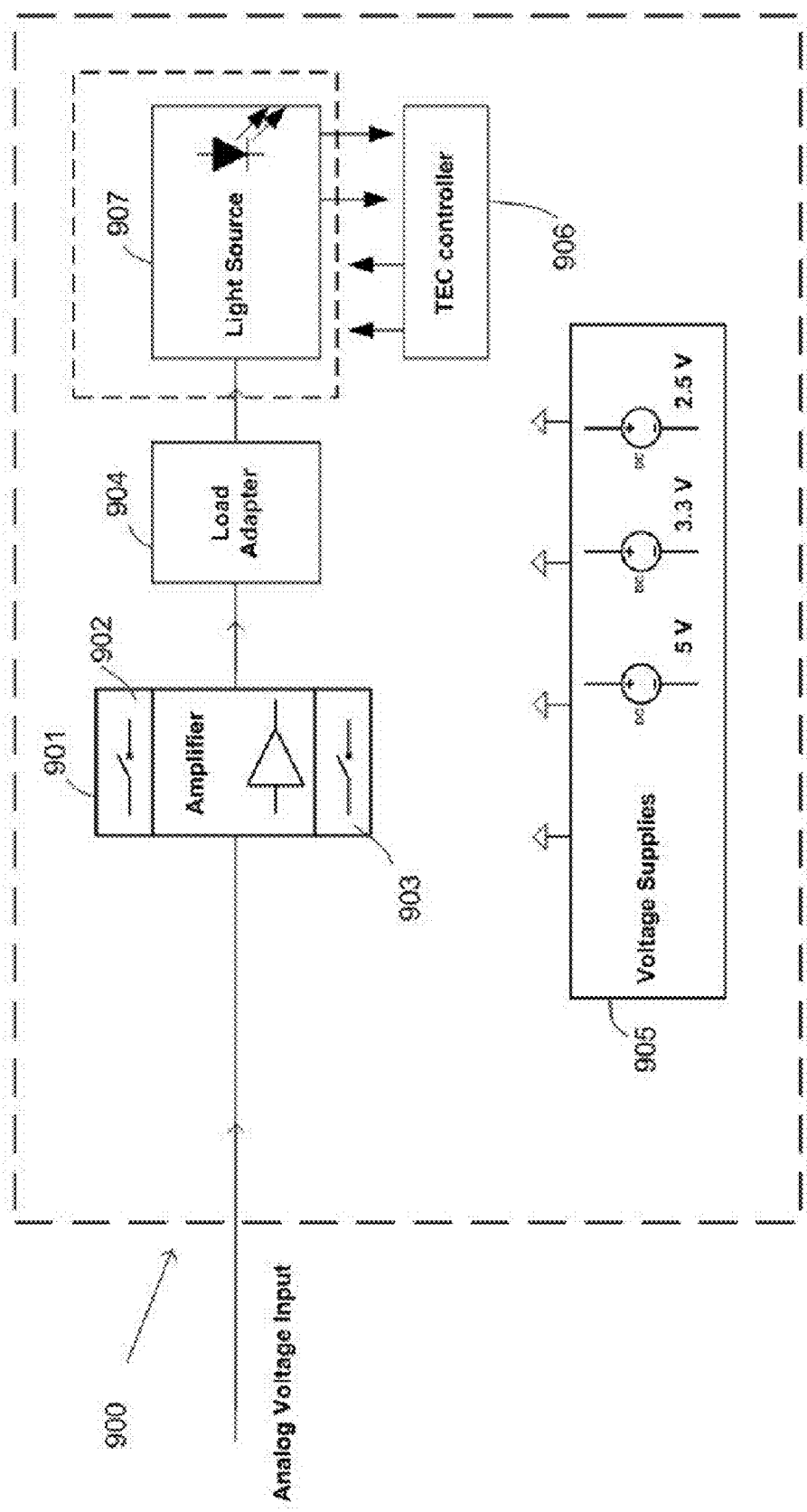
FIG. 9 is a schematic layout of a standalone electrical to optical linear converter based on the embodiment of FIG. 4.

Referring to FIG. 9, the input to the standalone electrical to optical linear converter 900 can be single ended or a differential analog voltage waveform which is fed to the amplifier module 903, and a load adapter 904 that connects to the light source 907. The standalone electrical to optical linear converter 900 may include other sub systems such as a selection of DC voltage supplies 905 adapted for powering the different electronic components which may require different driving voltages. For selected optical sources the optical amplifier 900 may also include a thermal controller 906 that typically consists of a temperature sensor (not shown), a Thermo Electric Cooler (TEC) and TEC current driver and feedback circuit for controlling the temperature of the optical light source.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An optical high speed Arbitrary Waveform Generator (AWG) comprising:
    a trigger module configured to receive binary signals and generate a trigger output in response;
    a digital waveform shaper (DWS) module configured to receive a digital waveform and convert it to analog waveform;
    an amplifier module configured to amplify said analog waveform;
    said amplifier module comprises:
        a first amplifier configured to convert a low-level voltage produced by a DAC into a larger voltage signal;
        a second amplifier configured to receive said amplified signal from said first amplifier; and
        a feedback mechanism configured to provide said second amplifier a feedback signal for a final amplification;
    a load adapter module configured to match the electrical impedance of said amplifier module to the electrical impedance of a light source; and
    a voltage supply module adapted to supply voltage to said trigger module, said digital waveform shaper module, said amplifier module and said load adapter.

2. The AWG of claim 1, wherein said trigger module comprises an internal source of binary signals.

3. The AWG of claim 1, wherein said DWS module comprises:
    a logic unit;
    a waveform memory unit connected with said logic unit;
    a clock and timing system connected with said logic unit; and
    at least one Digital to Analog Converter (DAC) connected with said logic unit and with said clock and timing system, said logic unit configured, when triggered by said trigger module, to accesses said waveform memory and replay a digital waveform therefrom in a sequential order;
said clock configured to control the time interval between consecutive points in said waveform,
said timing system configured to adjusts the time delay between said trigger, said logic unit and said at least one DAC, said at least one DAC configured to convert the digital flow of points to analog signal.

4. The AWG of claim 3, wherein said at least one DAC comprises two DACs.

5. The AWG of claim 3, wherein said at least one DAC comprises differential output stage for producing two output analog voltages out of phase.

6. The AWG of claim 3, wherein said DWS is configured to communicate with a user's electronic device.

7. The AWG of claim 3, additionally comprising a switch configured to disconnect the flow of data to said DAC.

8. The AWG of claim 1, wherein said DWS module comprises:
    a Field Programmable Gate Array (FPGA) comprising a memory unit configured to store at least one digital waveform;
    a flash memory configured to store initializing parameters of said FPGA;
    a clock and timing system connected with said FPGA; and
    at least one Digital to Analog Converter (DAC) connected with said FPGA, said FPGA configured, when triggered by said trigger module, to replay the sequence of points in the digital waveform;
said clock configured to control the time interval between consecutive points in said waveform,
said timing system configured to adjusts the time delay between said trigger, said FPGA and said at least one DAC; said at least one DAC configured to convert the digital flow of points to analog signal.

9. The AWG of claim 8, wherein said at least one DAC comprises two DACs.

10. The AWG of claim 8, wherein said at least one DAC comprises differential output stage for producing two output analog voltages out of phase.

11. The AWG of claim 8, additionally comprising a switch configured to disconnect the flow of data to said DAC.

12. The AWG of claim 8, wherein said at least one digital waveform comprises a plurality of digital waveforms.

13. The AWG of claim 12, wherein said FPGA is configured to replay a specified sequence of said plurality of waveforms.

14. The AWG of claim 12, wherein said FPGA is configured to replay different segments of said plurality of waveforms.

15. The AWG of claim 8, wherein said DWS is configured to communicate with a user's electronic device.

16. The AWG of claim 15, wherein said communicating comprises receiving a digital waveform from said electronic user device.

17. The AWG of claim 1, wherein
    said second amplifier is connected with said first amplifier through three port network bias-T connector arrangement that is also connected to a DC voltage source.

18. The AWG of claim 1, wherein said first amplifier is selected from the group consisting of: a RF amplifier, a high speed operational amplifier and a video amplifier.

19. The AWG of claim 1, wherein said second amplifier is a fast operational amplifier.

20. The AWG of claim 17, wherein said bias-T connector comprises a switch configured to disconnect the voltage supply to said bias-T connector.

21. The AWG of claim 1, wherein said feedback mechanism comprises an optical tap configured to receive a fraction of the light output from said light source and convert it to an electrical signal.

22. The AWG of claim 21, wherein said feedback comprises one of an average and a peak of the electrical signal.

23. The AWG of claim 1, wherein said feedback mechanism comprises the output current that drives said light source.

24. The AWG of claim 23, wherein said feedback comprises one of an average and a peak of the current.

25. The AWG of claim 1, wherein said second amplifier is connected with a variable voltage supply and with one of a mid or high power field-effect transistor (FET) and bipolar junction transistors (BJT).

26. The AWG of claim 25, wherein said variable voltage supply is provided with a shutdown feature configured to deactivate the voltage and disable said light source.

27. The AWG of claim 1, wherein said light source is selected from the group consisting of: Laser Diode (LD), array of diode lasers, diode laser bars, light emitting diode (LED) and LED array.

28. The AWG of claim 1, wherein said light source comprises part of a larger system including an amplifying stage.

29. The AWG of claim 28, wherein said light source is a seed laser in any master oscillator power amplifier configurations.

30. The AWG of claim 28, wherein said light source is a pump source in any master oscillator power amplifier configurations.

31. The AWG of claim 1, additionally comprising a thermal controller configured to control the temperature of said light source.

32. The AWG of claim wherein said second amplifier is connected with a variable voltage supply and with one of a mid or high power field-effect transistor (FET) and bipolar junction transistors (BJT); and fast current limiter circuit connected at the output of said variable voltage supply; said current limiter circuit configured to protect said light source from over current.

33. An optical high speed Arbitrary Waveform Generator (AWG) comprising:
  a trigger module configured to receive binary signals and generate a trigger output in response;
  a digital waveform shaper (DWS) module configured to receive a digital waveform and convert it to analog waveform,
  an amplifier module configured to amplify said analog waveform;
  said amplifier module comprises:
    an amplifier configured to convert a low-level voltage produced by a DAC into a larger voltage signal;
    said amplifier connected with said DAC through three port network bias-T connector arrangement that is also connected to a DC voltage source; and
    a feedback mechanism configured to provide said amplifier a feedback signal for the final amplification;
  a load adapter module configured to match the electrical impedance of said amplifier module to the electrical impedance of a light source; and
  a voltage supply module adapted to supply voltage to said trigger module, said digital waveform shaper module, said amplifier module and said load adapter.

34. A standalone electrical to optical linear converter module for amplifying an arbitrary analog voltage waveform, comprising:
  a first amplifier configured to convert a low-level voltage produced by the DAC into a larger voltage signal;
  a second amplifier configured to receive the amplified signal, the second amplifier connected with the first amplifier through three port network bias-T connector arrangement that is also connected to a DC voltage source; and
  a feedback mechanism configured to provide the second amplifier a feedback signal for the final amplification, wherein the output signal of said second amplifier is connected to a light source selected from the group consisting of: laser diode (LD), array of diode lasers, diode laser bars, light emitting diode (LED) and LED.

35. A standalone electrical to optical linear converter module for amplifying an arbitrary analog voltage waveform, comprising:
  an amplifier configured to convert a low-level voltage produced by the DAC into a larger voltage signal;
    the amplifier connected with the DAC through three port network bias-T connector arrangement that is also connected to a DC voltage source; and
    a feedback mechanism configured to provide the amplifier a feedback signal for the final amplification, wherein the output signal of said amplifier is connected to a light source selected from the group consisting of: laser diode (LD), array of diode lasers, diode laser bars, light emitting diode (LED) and LED.

* * * * *